US012301123B2

(12) United States Patent
Miao et al.

(10) Patent No.: US 12,301,123 B2
(45) Date of Patent: May 13, 2025

(54) SWITCHING POWER SUPPLY CIRCUIT AND ASSOCIATED CONTROL CIRCUIT WITH FALSE TURN-ON PREVENTION OF SYNCHRONOUS RECTIFIER SWITCH

(71) Applicant: Chengdu Monolithic Power Systems Co., Ltd., Chengdu (CN)

(72) Inventors: Lei Miao, Chengdu (CN); Siran Wang, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 246 days.

(21) Appl. No.: 17/965,370

(22) Filed: Oct. 13, 2022

(65) Prior Publication Data
US 2023/0216420 A1 Jul. 6, 2023

(30) Foreign Application Priority Data
Dec. 28, 2021 (CN) .......................... 202111626545.X (51) Int. Cl.
*H02M 3/335* (2006.01)
*H02M 1/00* (2006.01)

(52) U.S. Cl.
CPC ..... *H02M 3/33592* (2013.01); *H02M 1/0054* (2021.05)

(58) Field of Classification Search
CPC ............................................... H02M 3/33592
See application file for complete search history.

(56) References Cited

U.S. PATENT DOCUMENTS

| | | |
|---|---|---|
| 8,102,680 B2 | 1/2012 | Ren et al. |
| 8,976,547 B2 | 3/2015 | Ren et al. |
| 9,379,630 B2 | 6/2016 | Miao |
| 10,432,104 B2 | 10/2019 | Li et al. |
| 10,673,344 B2 | 6/2020 | Wang |
| 10,951,124 B2 | 3/2021 | Li et al. |
| 11,031,877 B2 | 6/2021 | Miao |
| 11,088,627 B2 | 8/2021 | Wang |
| 11,356,030 B2* | 6/2022 | Miao ................... H02M 1/0054 |
| 2019/0379293 A1* | 12/2019 | Kannan ............ H02M 3/33592 |
| 2020/0313562 A1* | 10/2020 | Hyugaji ............ H02M 3/33507 |
| 2021/0143725 A1* | 5/2021 | Deng ...................... H02M 1/08 |

FOREIGN PATENT DOCUMENTS

CN 110752755 A * 2/2020 .......... H02M 1/0054

* cited by examiner

*Primary Examiner* — Peter M Novak
(74) *Attorney, Agent, or Firm* — Perkins Coie LLP (57) ABSTRACT

A method to control a synchronous rectifier (SR) switch in a switching power supply circuit having an energy storage component coupled to the SR switch, the method is: generating a turning-ON control signal by comparing a drain-source sensing voltage of the SR switch with a turn ON threshold voltage; limiting an ON-time of the SR switch at least not less than a minimum on-time when the turning-ON control signal is asserted and an indicium signal having a first level indicating a fast mode; and removing the minimum on-time limitation to the SR switch and turning OFF the SR switch responsive to the drain-source sensing voltage of the SR switch exceeding a turn OFF threshold voltage when the turning-ON control signal is asserted and the indicium signal having a second level indicating a slow mode.

19 Claims, 9 Drawing Sheets

SWITCHING POWER SUPPLY CIRCUIT AND ASSOCIATED CONTROL CIRCUIT WITH FALSE TURN-ON PREVENTION OF SYNCHRONOUS RECTIFIER SWITCH

CROSS-REFERENCE TO RELATED APPLICATIONS

This application claims the benefit of CN application 20211 1626545.X, filed on Dec. 28, 2021, and incorporated herein by reference.

TECHNICAL FIELD

The present invention relates generally to electrical circuits, and more particularly, relates to switching power supply circuits with synchronous rectification.

BACKGROUND

In an isolated switching power supply, an input voltage is received at a primary side of a transformer, and a diode at a secondary side of the transformer is replaced by a controllable synchronous rectifier (SR) switch. This synchronous rectification scheme is widely used at the secondary side of the isolated switching power supply because of its high conversion efficiency.

However, during light load conditions, the power saved by the synchronous rectification is minor, and may less than the power consumed by a SR switch driver. For this reason, when a controller of the isolated switching power supply detects a light load, the synchronous rectification is latched off into non-synchronous rectification. The body diode of the SR switch is used during the non-synchronous rectification. Subsequently, if the controller detects a heavy load and the synchronous rectification is active again.

The new challenge is that the latch-off of the synchronous rectification may reduce the efficiency due to false turn-on, and in some worse cases, which may even cause overheating if the duration of the non-synchronous rectification is too long.

SUMMARY

Embodiments of the present invention are directed to secondary control circuits for controlling a synchronous rectifier (SR) switch, the secondary control circuit comprises a timer, a first determination circuit, a second determination circuit, a logic circuit and a gate driver. The timer is configured to record a time duration when a drain-source sensing voltage of the SR switch is greater than a reference voltage during a switching cycle. The first determination circuit is configured to make a first determination whether a cycle count reaches a predetermined threshold number, wherein the cycle count indicates a number of consecutive switching cycles that the time duration is greater than an ON-time of the SR switch. The second determination circuit makes a second determination whether the time duration is greater than a predetermined window of time. The logic circuit produces an indicium signal having a first level indicating a fast mode and a second level indicating a slow mode in response to the first determination and the second determination. The gate driver circuit is configured to drive the SR switch, wherein when the indicium signal has the first level, the ON-time of the SR switch is at least not less than a minimum on-time, and when the indicium signal has the second level, the ON-time of the SR switch is not limited by the minimum on-time and is turned off responsive to the drain-source sensing voltage of the SR switch exceeding a turn OFF threshold voltage.

BRIEF DESCRIPTION OF THE DRAWING

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
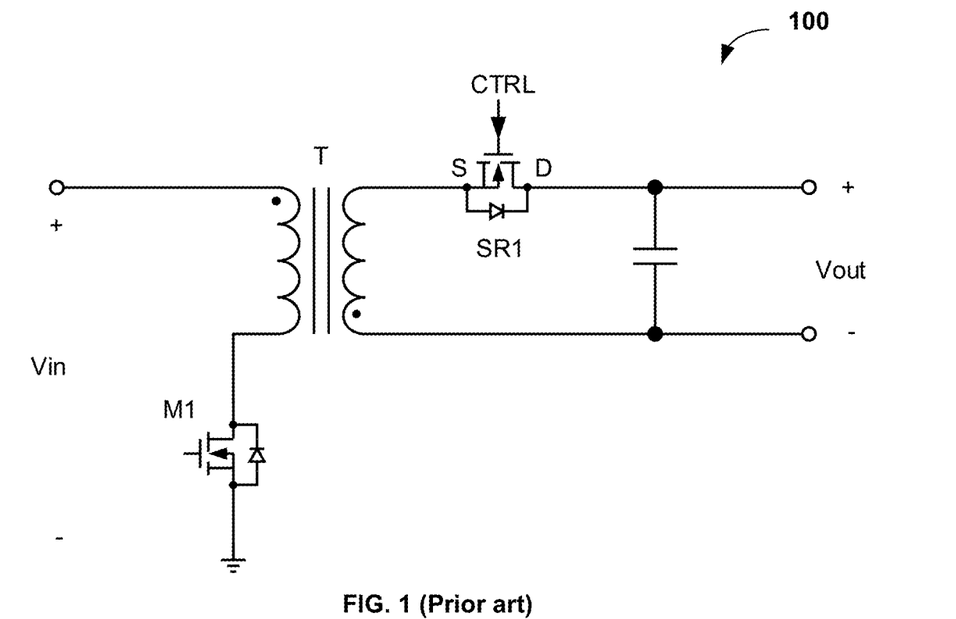
FIG. 1 schematically illustrates a flyback converter 100 with synchronous rectification.

In the following description, a flyback converter with synchronous rectification, as an example, is considered to describe one or more problems to be solved by this invention. FIG. 1 schematically illustrates a flyback converter 100 with synchronous rectification.

The flyback converter 100 shown in FIG. 1 comprises a transformer T, a primary switch M1 coupled to a primary side of the transformer T, and a SR switch SR1 coupled to a secondary side of the transformer T. The primary side of transformer T receives an input voltage Vin, and the secondary side of the transformer T provides an output voltage Vout. The SR switch SR1 comprises a drain terminal D, a source terminal S and a gate terminal G. A drain-source sensing voltage VDS of the SR switch SR1 is detected to generate a secondary control signal CTRL for turning-ON and turning-OFF of the SR switch SR1.

Figure 2:
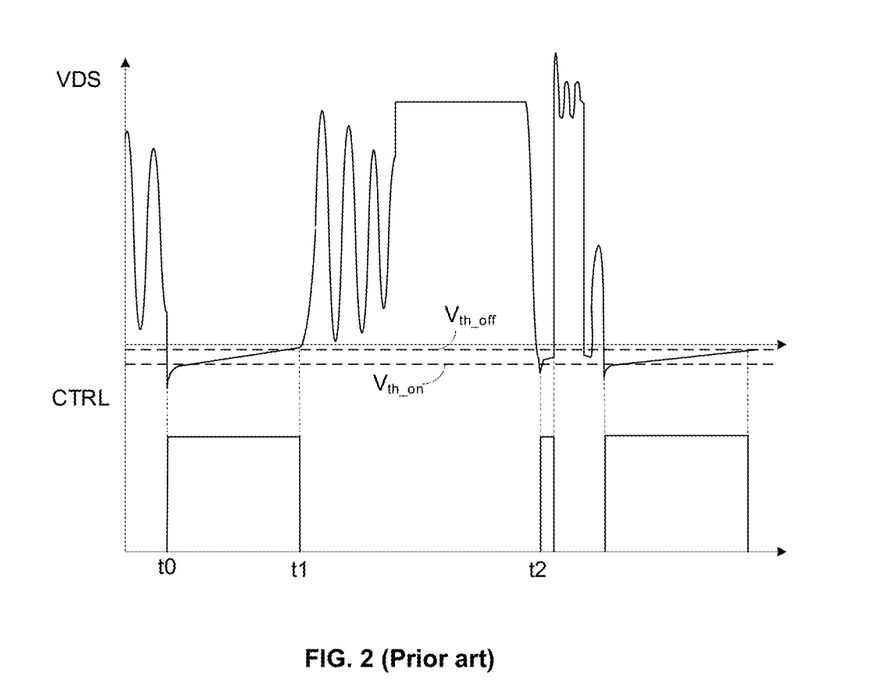
FIG. 2 illustrates working waveforms of the flyback converter 100 shown in FIG. 1 in discontinuous current mode (DCM) operation.

FIG. 2 illustrates working waveforms of the flyback converter 100 shown in FIG. 1 in DCM operation. At time t0, the primary switch M1 is turned OFF, the energy stored in the primary side of the transformer T is transferred to the secondary side of the transformer T, a current generated on the secondary side winding flows through a body diode of the SR switch SR1, the body diode of the SR switch SR1 is forward-conducted, and the drain-source sensing voltage VDS of the SR switch SR1 is quickly reduced to below 0V and to be a negative value. When the drain-source sensing voltage VDS of the SR switch SR1 is decreased to reach a turn ON threshold voltage Vth_on, the secondary control signal CTRL quickly becomes a high level, to turn ON the SR switch SR1. At time t1, the drain-source sensing voltage VDS of the SR switch SR1 is increased to reach a turn OFF threshold voltage Vth_off, the secondary control signal CTRL quickly becomes a low level to turn OFF the SR switch SR1. In DCM operation, the demagnetizing ringing may drop the drain-source sensing voltage VDS below 0V. If the drain-source sensing voltage VDS reaches the turn ON threshold voltage Vth_on during the ringing, the SR switch SR1 may be turned ON quickly by mistake. For example, FIG. 2 shows a false turn-on situation at time t2, the drain-source sensing voltage VDS rings below the turn ON threshold voltage Vth_on, the secondary control signal CTRL becomes the high level, the SR switch SR1 is turned ON quickly by mistake. Not only does this increase power loss and high voltage spike, but may also lead to shoot-through if the primary switch M1 is turned ON within a minimum on-time.

In addition, the inventor of the present invention noticed that when the flyback converter 100 works in light load or even ultra light load, the SR switch SR1 will stop synchronous rectification, and the non-synchronous rectification mode will work, the body diode of the SR switch SR1 will be turned on. Since the voltage drop of the body diode of the SR switch SR1 is large, it will cause large energy losses and even introduce the problem of overheating of the system.

Figure 3:
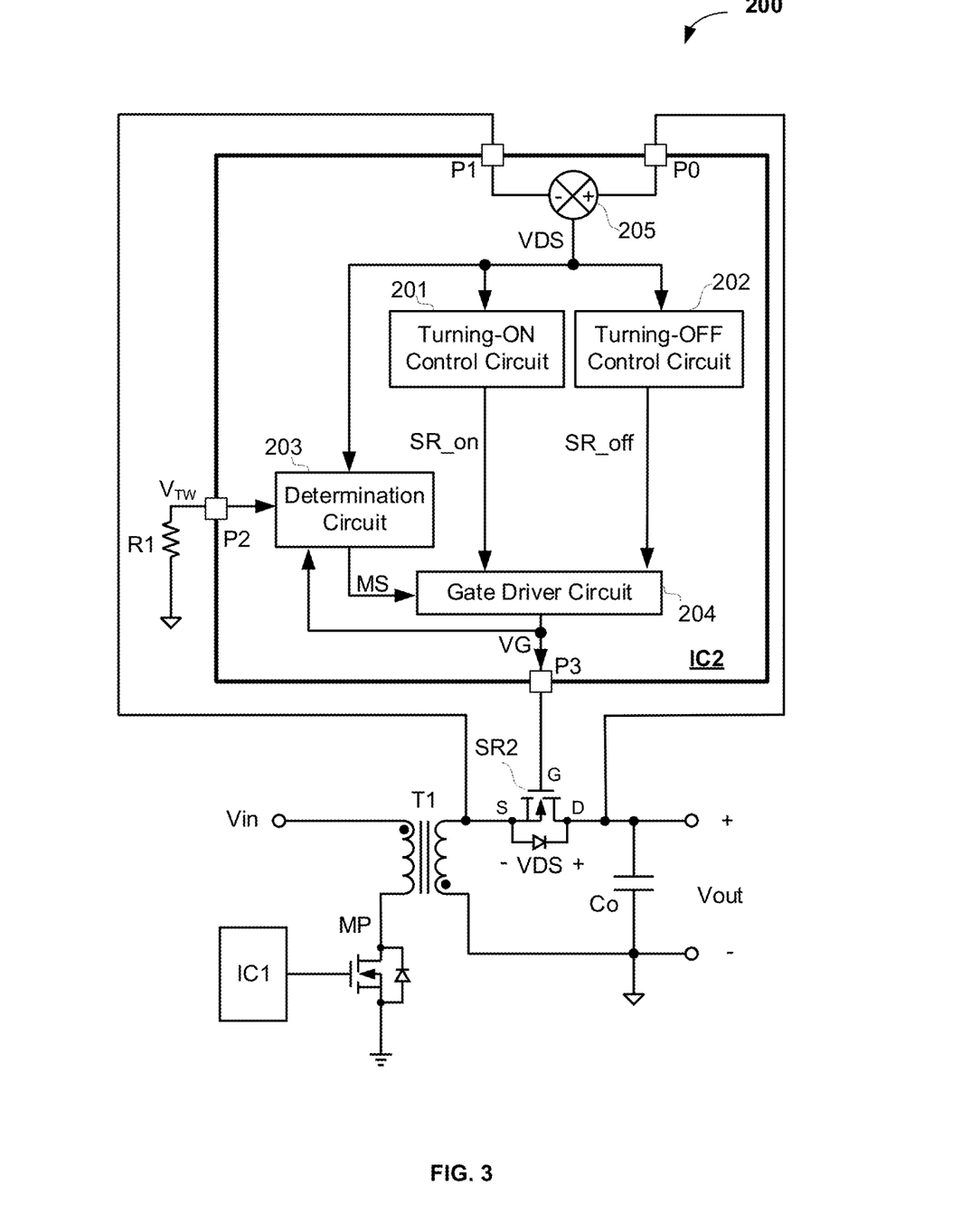
FIG. 3 illustrates a circuit block diagram of a switching power supply circuit 200 with synchronous rectification in accordance with an embodiment of the present invention.

The problems of false turn-on of the SR switch and prolonged overheating due to non-synchronous rectification mode can be solved by the present invention. FIG. 3 illustrates a circuit block diagram of a switching power supply circuit 200 with synchronous rectification in accordance with an embodiment of the present invention. As shown in FIG. 3, the switching power supply circuit 200 comprises an energy storage component T1, a primary switch MP coupled to a primary side of the energy storage component T1, a primary control circuit IC1 for controlling the primary switch MP, a SR switch SR2 coupled to a secondary side of the energy storage component T1, and a secondary control circuit IC2 for controlling the SR switch SR2. The primary side of the energy storage component T1 receives an input voltage Vin, and the secondary side of the energy storage component T1 provides an output voltage Vout.

In the embodiment of FIG. 3, the secondary control circuit IC2 is configured to be an integrated circuit and generate a secondary control signal VG at pin P3 for controlling and driving the SR switch SR2. The SR switch SR2 comprises a drain terminal D, a source terminal S and a gate terminal G. The secondary control circuit IC2 comprises a turning-ON control circuit 201, a turning-OFF control circuit 202, a determination circuit 203 and a gate driver circuit 204.

As shown in FIG. 3, the secondary control circuit IC2 has a pin P1 coupled to the S terminal of the SR switch SR2 and a pin P0 coupled to the D terminal of the SR switch SR2. A subtracting circuit 205 receives voltages at the S terminal and the D terminal of the SR switch SR2, and provides a drain-source sensing voltage VDS of the SR switch SR2 at its output terminal. In other embodiments, the drain-source sensing voltage VDS of the SR switch SR2 can be sensed by other components.

In the embodiment of FIG. 3, the turning-ON control circuit 201 has a first input terminal, a second input terminal and an output terminal. Wherein the first input terminal is configured to receive the drain-source sensing voltage VDS of the SR switch SR2, the second input terminal is configured to receive a turn ON threshold voltage Vth_on. The turning-ON control circuit 201 is configured to compare the drain-source sensing voltage VDS of the SR switch SR2 with the turn ON threshold voltage Vth_on and generates a turning-ON control signal SR_on at the output terminal. In one embodiment, when the drain-source sensing voltage VDS is decreased to below the turn ON threshold voltage Vth_on, the turning-ON control circuit 201 provides the turning-ON control signal SR_on having a high level, and the turning-ON control signal SR_on is asserted. When the turning-ON control signal SR_on has a low level, and the turning-ON control signal SR_on is de-asserted.

In one embodiment, the turning-ON control circuit 201 comprises a primary ON detection circuit and a first comparison circuit. The primary ON detection circuit is configured to detect whether the primary switch at the primary side is on and to generate a primary on detection signal by comparing a drain-source sensing voltage VDS with a reference voltage VDREF. The reference voltage VDREF can be updated dynamically during each switching cycle. In one embodiment, a reference voltage generator is configured to sample and hold a maxim value of the drain-source sensing voltage VDS of the SR switch SR2 and provide the maxim value of the drain-source sensing voltage VDS as the reference voltage VDREF.

The first comparison circuit has a first input terminal, a second input terminal, an enable terminal and an output terminal, wherein the first input terminal is configured to receive the drain-source sensing voltage VDS of the SR switch SR2, the second input terminal is configured to receive the turn ON threshold voltage Vth_on, the enable terminal is configured to receive the primary on detection signal. Wherein when the primary on detection signal is asserted, the first comparison circuit compares the drain-source sensing voltage VDS of the SR switch SR2 with the turn ON threshold voltage Vth_on and provides the turning-ON control signal SR_on at the output terminal.

The turning-OFF control circuit 202 has a first input terminal, a second input terminal and an output terminal, wherein the first input terminal is configured to receive the drain-source sensing voltage VDS, the second input terminal is configured to receive a turn OFF threshold voltage Vth_off. The turning-OFF control circuit 202 is configured to compare the drain-source sensing voltage VDS with the turn OFF threshold voltage Vth_off, and to generate a turning-OFF control signal SR_off at the output terminal. In one embodiment, when the drain-source sensing voltage VDS is increased to above the turn OFF threshold voltage Vth_off, the turning-OFF control circuit 202 provides the turning-OFF control signal SR_off having a high level, and the turning-OFF control signal SR_off is asserted.

The determination circuit 203 is configured to determine work mode of the gate driver circuit 204 to be a fast mode or a slow mode, to turn ON the SR switch SR2, based on the operation of the switching power supply circuit 200. As shown in FIG. 2, the determination circuit 203 has a first input terminal, a second input terminal and an output terminal, wherein the first input terminal is configured to receive the drain-source sensing voltage VDS of the SR switch SR2, the second input terminal is configured to receive a control signal VG of the SR switch SR2, the determination circuit 203 provides an indicium signal MS at the output terminal.

In one embodiment, the determination circuit 203 comprises a timer, a first determination circuit, a second determination circuit and a logic circuit. The timer is configured to record a time duration when the drain-source sensing voltage VDS of the SR switch SR2 is greater than the reference voltage VDREF during a switching cycle. The first determination circuit is configured to make a first determination whether a cycle count reaches a predetermined threshold number, wherein the cycle count indicates a number of consecutive switching cycles that the time duration is greater than an ON-time of the SR switch SR2, and provide a first determination signal JD1 based on the first determination. The second determination circuit is configured to make a second determination whether the time duration is greater than a predetermined window of time, and provide a second determination signal JD2 based on the second determination. The logic circuit receives the first determination signal JD1 and the second determination signal JD2, provides the indicium signal MS at an output terminal. The indicium signal MS has a first level indicating the fast mode and a second level indicating a slow mode in response to the first determination and the second determination, respectively.

In the embodiment of FIG. 3, the gate driver 204 is configured to provide the control signal VG to drive the SR switch SR2 based on the turning-ON control signal SR_on, the turning-OFF control signal SR_off and the indicium signal MS. The gate driver circuit 204 has a first input terminal, a second input terminal, a third input terminal and an output terminal, wherein the first input terminal is configured to receive the indicium signal MS, the second input terminal is configured to receive the turning-ON control signal SR_on, the third input terminal is configured to receive the turning-OFF control signal SR_off. The gate driver circuit 204 is configured to control the turning-ON of the SR switch S2 based on the indicium signal MS and the turning-ON control signal SR_on, and is further configured to control the turning-OFF of the SR switch SR2 based on the indicium signal MS and the turning-OFF control signal SR_off.

In one embodiment, when the indicium signal MS has a first level, the fast mode of the gate driver circuit 204 is determined, the ON-time of the SR switch SR2 is at least not less than a minimum on-time Ton_min, to prevent noise from ringing. When the indicium signal MS has a second level, the slow mode of the gate driver circuit 204 is determined, the minimum on-time Ton_min limitation to the SR switch SR2 is removed and the SR switch SR2 is turned OFF responsive to the drain-source sensing voltage VDS of the SR switch SR2 exceeding the turn OFF threshold voltage Vth_off. In other words, the ON-time of the SR switch SR2 is at least not less than the minimum on-time Ton_min in the fast mode, and the ON-time of the SR switch SR2 could be less than the minimum on-time Ton_min in the slow mode.

In a further embodiment, in the fast mode, once the turning-ON control signal SR_on is asserted, the gate driver circuit 204 starts charging the gate voltage of the SR switch SR2 with a first charge current IG1 after a first turn ON delay Ton_delay1. The gate voltage of the SR switch SR2 is increased to reach a gate maximum voltage Vmax, to turn ON the SR switch SR2. In the slow mode, once the turning-ON control signal SR_on is asserted, the gate driver circuit 204 starts charging the gate voltage of the SR switch SR2 with a second charge current IG2 after a second turn ON delay Ton_delay2. The gate voltage of the SR switch SR2 is also increased to reach the gate maximum voltage Vmax, to turn ON the SR switch SR2. Wherein the second charge current IG2 is less than the first charge current IG1, and the second turn ON delay Ton_delay2 is less than the first turn ON delay Ton_delay1.

When the gate driver circuit 204 is determined to work in the fast mode, due to the shorter turn ON delay Ton_delay1 and the larger charge current IG1, the body diode of the SR switch SR2 has a short on-time, the conduction loss is small and thus the overall efficiency is good. When the gate driver circuit 204 is determined to work in the slow mode, due to the longer turn ON delay Ton_delay2, the minimum on-time limitation to the SR switch SR2 is removed. Meanwhile, synchronous rectification is used to replace the non-synchronous rectification of the body diode for a short time, which reduces the voltage drop loss of the body diode and alleviates the overheating. In one embodiment, the second turn ON delay Ton_delay2 is 5 times that of the first turn ON delay Ton_delay1.

In addition, in the fast mode, when the turning-OFF control signal SR_off is asserted and the ON-time of the SR switch SR2 is longer than the minimum on-time Ton_min, the gate driver circuit 204 is configured to turn on a discharge switch coupled between the gate terminal of the SR switch SR2 and a ground, to provide a discharge path. The gate voltage of the SR switch SR2 is decreased, and the SR switch SR2 is turned OFF. While in the slow mode, once the turning-OFF control signal SR_off is asserted, the gate driver circuit 204 immediately turn on the discharge switch coupled between the gate terminal of the SR switch SR2 and the ground, to provide the discharge path, and the gate voltage of the SR switch SR2 is decreased, and thus the SR switch SR2 is turned OFF without any minimum on-time limitation.

In the embodiment shown in FIG. 3, the secondary control circuit IC2 comprises pins P0-P3. Wherein the Pin P0 is coupled to the drain terminal of the SR switch SR2 and the pin P1 is coupled to the source terminal of the SR switch SR2, and thus the drain-source sensing voltage VDS is provided. The determination circuit 203 further has a third input terminal coupled to a discrete off-chip resistor R1 through the pin P2 of the secondary control circuit IC2. A voltage signal $V_{TW}$ on the resistor R1 is an adjustable signal representative of a predetermined window of time $T_W$. The voltage signal $V_{TW}$ can be adjusted by changing the resistance of the resistor R1 so that the window of time $T_W$ can be regulated. The Pin P3 is coupled to the gate terminal of the SR switch SR2 to provide the control signal VG, to control the SR switch SR2. In one embodiment, the SR switch SR2 can be integrated into the secondary control circuit IC2.

Embodiments of the invention are described herein in the context of one practical non-limiting application, namely, a flyback converter with synchronous rectification. Embodiments of the invention, however, are not limited to such applications, and the techniques described herein may also be utilized in other switching power supply circuit, such as LLC resonant converter with synchronous rectification.

Figure 4:
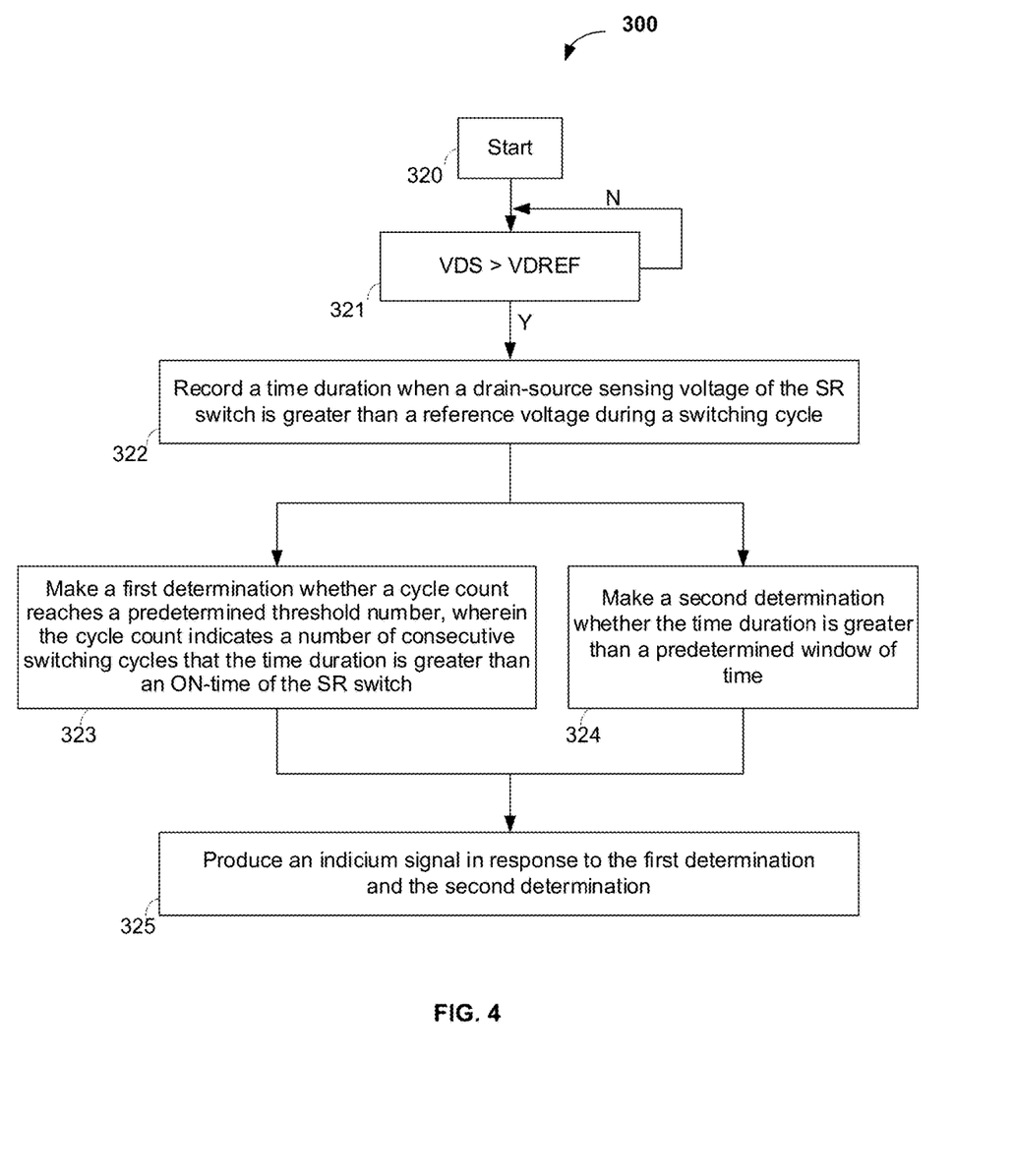
FIG. 4 illustrates a method 300 for producing an indicium signal shown in FIG. 3 in accordance with an embodiment of the present invention.

FIG. 4 illustrates a method 300 for producing an indicium signal shown in FIG. 3 in accordance with an embodiment of the present invention. The method 300 comprises steps 320-325.

At step 320, the determination circuit 203 starts operation. At step 321, make a detection whether the drain-source sensing voltage VDS is greater than the reference voltage VDREF. If yes, go step 321. Otherwise, back to step 321 and repeat the detection.

At step 322, recording a time duration when the drain-source sensing voltage VDS of the SR switch SR2 is greater than the reference voltage VDREF during a switching cycle.

At step 323, making a first determination whether a cycle count reaches a predetermined threshold number, wherein the cycle count indicates a number of consecutive switching cycles that the time duration is greater than an ON-time of the SR switch.

At step 324, making a second determination whether the time duration is greater than the predetermined window of time $T_W$.

At step 325, the indicium signal is produced in response to the first determination and the second determination.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Figure 5:
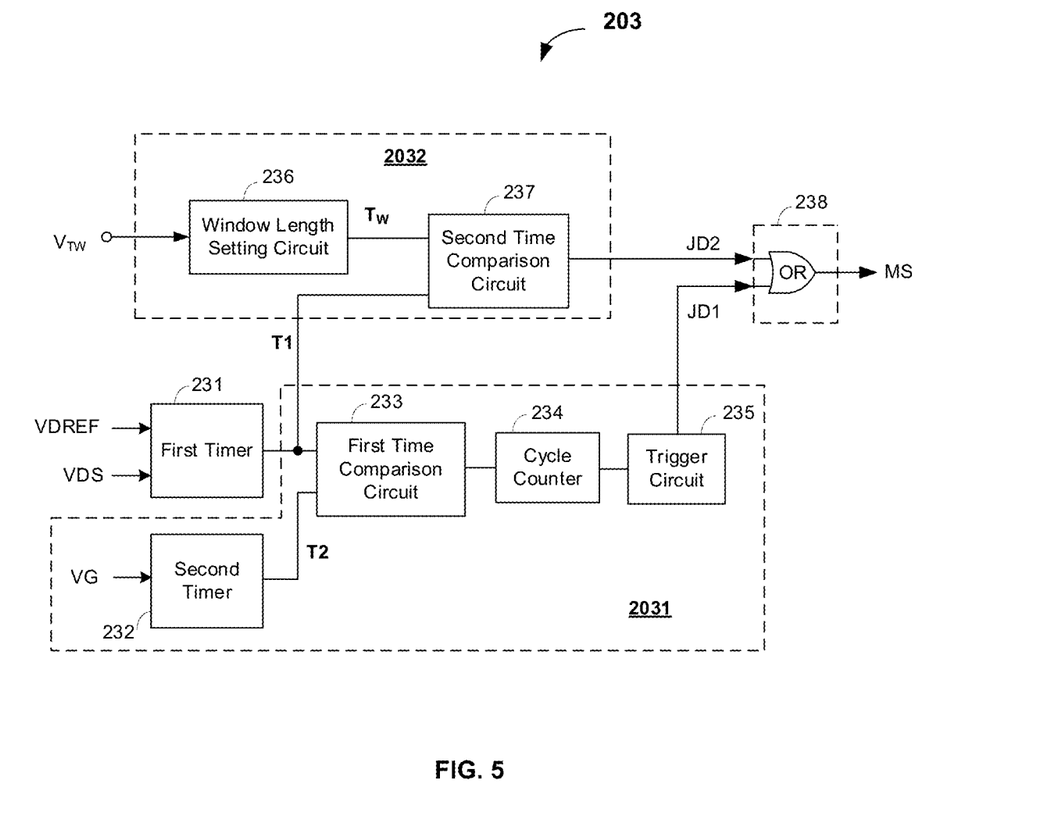
FIG. 5 illustrates a circuit block diagram of a determination circuit 203 shown in FIG. 3 in accordance with an embodiment of the present invention.

FIG. 5 illustrates a circuit block diagram of a determination circuit 203 shown in FIG. 3 in accordance with an embodiment of the present invention. In the embodiment shown in FIG. 5, the determination circuit 203 comprises a first timer 231, a first determination circuit 2031, a second determination circuit 2032 and a logic circuit 238.

As shown in FIG. 5, the first timer 231 receives the drain-source sensing voltage VDS and the reference voltage VDREF, starts setting a time interval in response to the drain-source sensing voltage VDS exceeding the reference voltage VDREF and resets the time interval in response to the drain-source sensing voltage VDS returning to cross the reference voltage VDREF. The first timer 231 records the time interval as a first time duration T1.

The first determination circuit 2031 comprises a second timer 232, a first time comparison circuit 233, a cycle counter 234 and a trigger circuit 235. The second timer 232 receives the control signal VG of the SR switch SR2, and records the ON-time of the SR switch SR2 as a second time duration T2.

The first time comparison circuit 233 compares with the first time duration T1 with the second time duration T2 and provides a comparison signal at an output terminal based on the comparison. Baes on the comparison signal outputted by the first time comparison circuit 233, the cycle counter 234 is configured to maintain a count which indicates a number of consecutive switching cycles in each of which the first time duration T1 is greater than the second time duration T2. When the cycle count maintained by the cycle counter 234 is greater than or equal a particular or predetermined threshold number of consecutive switching cycles (e.g., 2 consecutive times) or "count", then the trigger circuit 235 generates a first determination signal JD1.

In one embodiment, the cycle counter 234 is enabled to increment a register (not illustrated) in the cycle counter 234 if, and only if the first time duration T1 is greater than the second time duration T2. The cycle counter 354 resets whenever the first time duration T1 is not greater than the second time duration T2 within the consecutive switching cycles. In this situation, the trigger circuit 235 does not output the first determination signal JD1.

In the embodiment of FIG. 5, the second determination circuit 2032 comprises a window length setting circuit 236 and a second time comparison circuit 237. The window length setting circuit 236 is coupled to receive the voltage signal $V_{TW}$, to set the predetermined window of time $T_W$ for VDS ringing detection. The second time comparison circuit 237 has a first input terminal, a second input terminal and an output terminal, wherein the first input terminal is coupled to receive the drain-source sensing voltage VDS of the SR switch SR2, the second input terminal is coupled to receive the window of time $T_W$. The second time comparison circuit 237 compares the time duration T1 with the window of time $T_W$, provides the second determination signal JD2 at the output terminal according to the comparison result.

In one embodiment, the second determination signal JD2 has high level when the first time duration T1 is greater than the window of time $T_W$. The logic circuit 238 comprises an OR gate. The OR gate has a first input terminal, a second input terminal and an output terminal, wherein the first input terminal is coupled to receive the first determination signal JD1, the second input terminal is coupled to receive the second determination signal JD2, and the OR gate provides the indicium signal MS at the output terminal.

According to the embodiments shown in FIG. 4 and FIG. 5, the first determination and the second determination can not only avoid the false turn-on from the VDS ringing, but also in cases other than the first determination and the second determination, the gate driver circuit is configured to work in the slow mode, synchronous rectification is used to replace the non-synchronous rectification of the body diode for a short time, which remarkably reduces the voltage drop loss of the body diode and alleviates the heat dissipation of the SR switch. Furthermore, when the SR switch is turned ON in response to the slow mode, the instant load transient information of the secondary side of the switching power supply circuit can also be transmitted to the primary side, which improves the dynamic response ability of the system.

Figure 6:
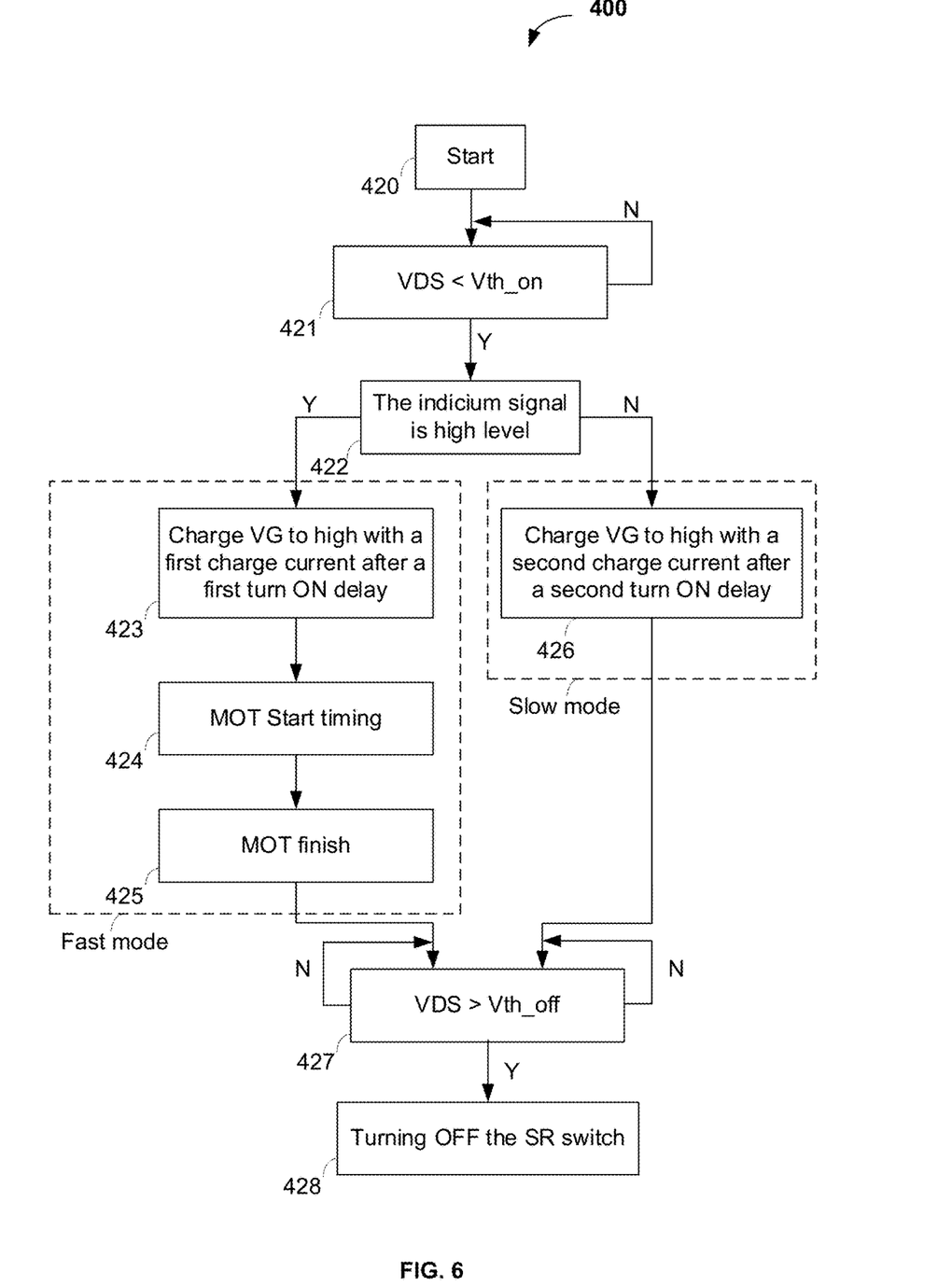
FIG. 6 illustrates a method 400 to control a SR switch in a switching power supply circuit in accordance with an embodiment of the present invention.

FIG. 6 illustrates a method 400 to control a SR switch in a switching power supply circuit in accordance with an embodiment of the present invention. As shown in FIG. 6, this method 400 comprises steps 420-421.

At step 420, the secondary control circuit starts operation.

At step 421, detecting whether the drain-source sensing voltage VDS is less than the turn ON threshold voltage Vth_on. If yes, go step 422, if not, go back to step 420 and continue to detect.

At step 422, an indicium signal is provided to determine a fast mode or a slow mode. In one embodiment, the indicium signal is high level, the fast mode is determined to turn ON the SR switch. In another embodiment, the indicium signal is low level, the slow mode is determined to turn ON the SR switch.

The operation in the fast mode can comprises steps 423-425. At step 423, when the turning-ON control signal SR_on is asserted, the gate voltage of the SR switch is charged with the first charge current IG1 after the first turn ON delay Ton_delay1. At step 424, the minimum on-time timer 23 starts timing. At step 425, the timing is over, the method proceeds to step 427, and the ON-time of the SR switch is equal or longer than the minimum on-time Ton_min.

The operation in the slow mode can comprises step 426. At step 426, the gate voltage of the SR switch is charged with the second charge current IG2 after the second turn ON delay Ton-delay2. Subsequently, enters to step 427.

At step 427, detecting whether the drain-source sensing voltage is increased to above the turn ON threshold voltage Vth_off. If yes, go step 428, and the SR switch SR2 is turned OFF. Otherwise, back to step 427 and wait again.

Figure 7:
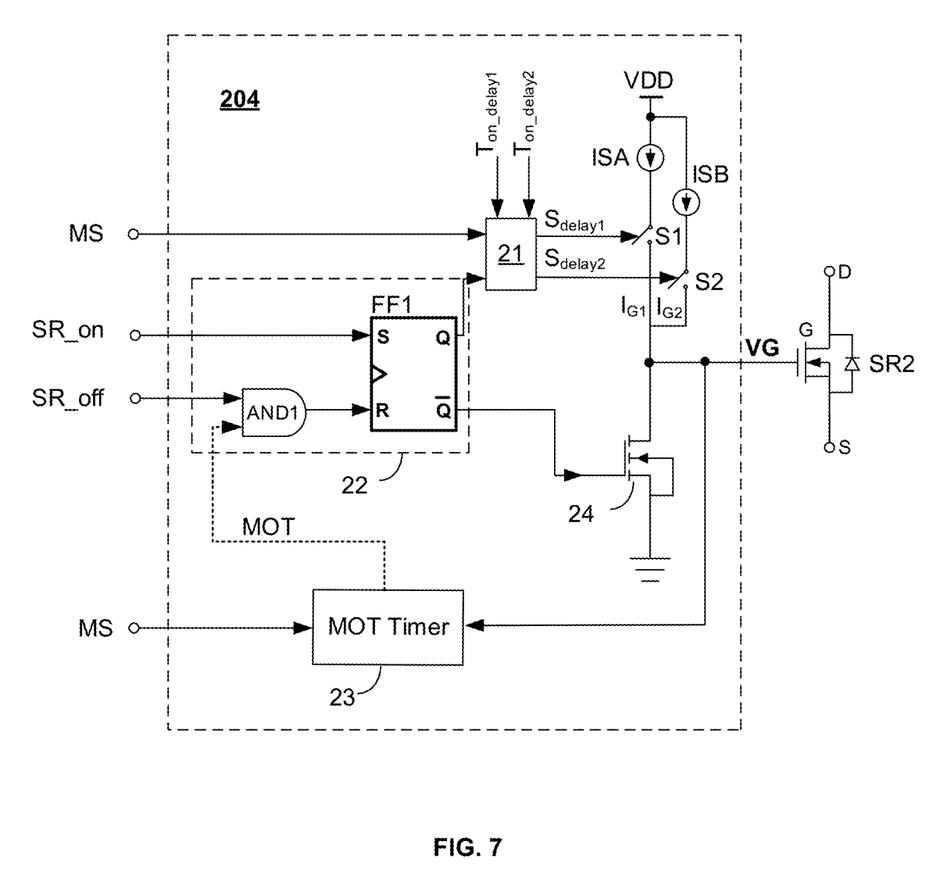
FIG. 7 illustrates a gate driver circuit 204 shown in FIG. 3 in accordance with an embodiment of the present invention.

FIG. 7 illustrates a gate driver circuit 204 shown in FIG. 3 in accordance with an embodiment of the present invention.

As shown in FIG. 7, the gate driver circuit 204 comprises a first AND gate AND1, a flip-flop FF1, a selective delay circuit 21, a first charge switch S1, a second charge switch S2, a first charging current source ISA and a second charging current source ISB, a minimum on-time timer 23 and a discharge switch 24.

In the embodiment shown in FIG. 7, the first AND gate AND1 has a first input terminal, a second input terminal and an output terminal, wherein the first input terminal is configured to receive the turning-OFF control signal SR_off. The flip-flop FF1 has a set terminal, a reset terminal, an output terminal and a reversing output terminal, wherein the set terminal is configured to receive the turning-ON control signal SR_on, the reset terminal is coupled to the output terminal of the first AND gate AND1. The selective delay circuit 21 has a control terminal, an enable terminal and an output terminal, wherein the control terminal is coupled to receive the indicium signal MS, the enable terminal is coupled to the output terminal of the flip-flop FF1, the selective delay circuit 21 is configured to provide a first turn ON delay signal $S_{delay1}$ with the first turn ON delay Ton_delay1 or a second turn ON delay signal $S_{delay2}$ with the second turn on delay Ton_delay2.

The first charge switch S1 is coupled in series with the first charge current source ISA and is configured to charge the gate voltage of the SR switch SR2 with the first charge current IG1 in response to the first turn ON delay signal $S_{delay1}$. The second charge switch S2 is coupled in series with the second charge current source ISB, and is configured to charge the gate voltage of the SR switch SR2 with a second charge current IG2 in response to the second turn ON delay signal $S_{delay2}$.

The minimum on-time timer 23 receives the indicium signal MS and the control signal VG and provides a minimum on-time control signal MOT that is provided to the second input terminal of the first AND gate AND1. The minimum on-time timer 23 is enabled in the fast mode and is disabled in the slow mode.

In detail, when the indicium signal MS has high level indicating the fast mode, the minimum on-time timer 23 is enabled, and thus the first AND gate AND1 is enabled until the ON-time of the SR switch is longer than the minimum on-time Ton_min, the SR switch can not be turned OFF within the minimum on-time Ton_min.

When the indicium signal MS has low level indicating the slow mode, the minimum on-time timer 23 is disabled and outputs the minimum on-time control signal MOT with high level, and thus the SR switch SR2 is turned OFF responsive to the drain-source sensing voltage VDS exceeding the turn OFF threshold voltage Vth_off, is not limited by the minimum on-time Ton_min.

The discharge switch 24 is coupled between the gate terminal of the SR switch SR2 and a ground, has a control terminal coupled to the reversing output terminal of the flip-flop FF1. When the turning-OFF control signal SR_off is asserted, the discharge switch 24 is turned ON to provide a discharge path, the gate voltage of the SR switch SR2 is decreased, and the SR switch SR2 is turned OFF.

Figure 8:
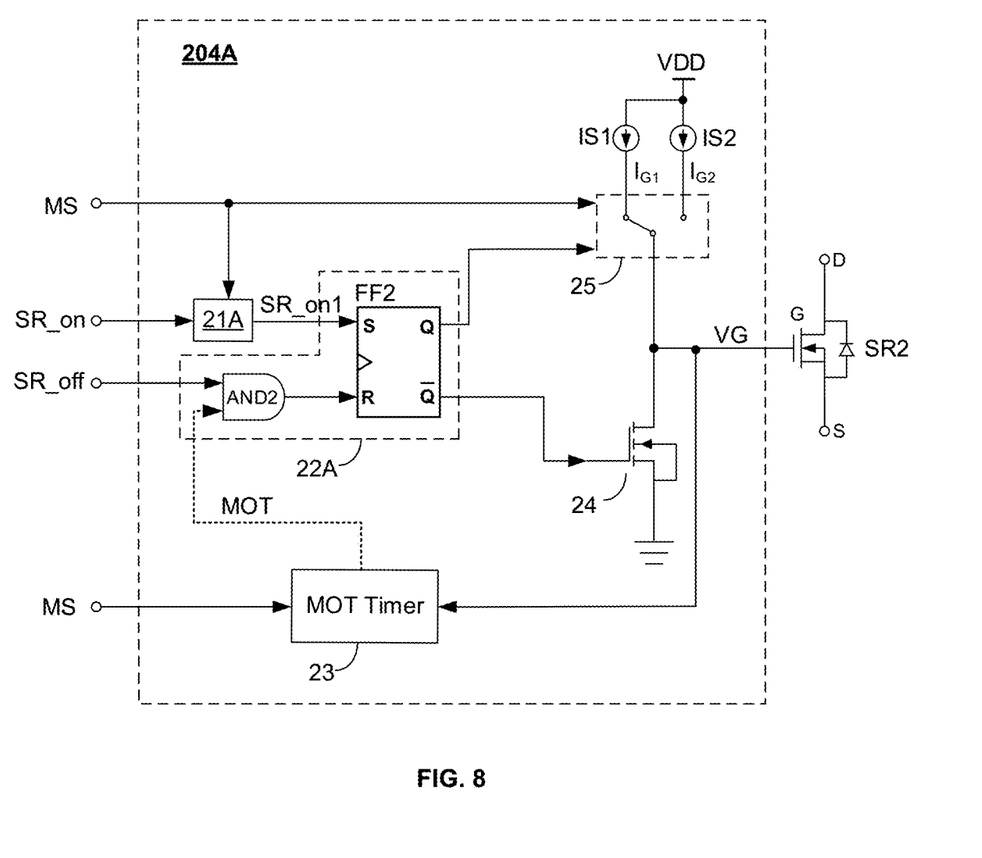
FIG. 8 illustrates a gate driver circuit 204A shown in FIG. 3 in accordance with another embodiment of the present invention.

FIG. 8 illustrates a circuit block diagram of a gate driver circuit 204A in accordance with another embodiment of the present invention. In the embodiment of FIG. 8, the gate driver 204A comprises a second AND gate AND2, a delay circuit 21A, a flip-flop FF2, a first charge current source IS1 and a second charge current source IS2, a selective circuit 25 and a discharge switch 24.

The second AND gate AND2 has a first input terminal, a second input terminal, and an output terminal, wherein the first input terminal is configured to receive the turning-OFF control signal SR_off. The delay circuit 21A has an input terminal, a control terminal and an output terminal, wherein the input terminal is configured to receive the turning-ON control signal SR_on, the control terminal is configured to receive the indicium signal MS, based on the incidium signal MS, the delay circuit 21A provides a turning ON delay signal SR_on1 at an output terminal after the determined turn ON delay. In detail, when the indicium signal MS is low level, the turning-ON delay signal SR_on1 lags the turning-ON control signal SR_on by the small turn ON delay. When the indicium signal MS is high level, the turning-ON delay signal SR_on1 lags the turning-ON control signal SR_on by the larger turn ON delay.

The flip-flop FF2 has a set terminal, a reset terminal, an output terminal and a reversing output terminal, wherein the set terminal is coupled to the output terminal of the delay circuit 21A to receive the turning-ON delay signal SR_on1, the reset terminal is coupled to the output terminal of the second AND gate AND2.

The first and second charge current sources IS1 and IS2, respectively, have a power supply terminal coupled to receive a power supply voltage VDD and an output terminal configured to provides the first charge current IG1 and the second charge current IG2, respectively. The first charge current IG1 is higher than the second charge current IG2. The selective circuit 25 has a first input terminal, a second input terminal, a control terminal, an enable terminal and an output terminal, wherein the first input terminal is coupled to the output terminal of the first charge current source IS1 to receive the first charge current IG1, the second input terminal is coupled to the output terminal of the second charge current source IS2 to receive the second charge current IG2, the control terminal is coupled to receive the indicium signal MS, the enable terminal is coupled to the output terminal of the flip-flop FF2. Based on the indicium signal MS, when the turning-ON control signal SR_on is asserted, the selective circuit 25 selects one of the first charge current IG1 and the second charge current IG2, and charges the gate voltage of the SR switch S2 with the selected charge current. When the indicium signal MS has a high level, the selective circuit 25 selects the first charge current IG1 to charge the gate terminal of the SR switch SR2, and charges the gate voltage of the SR switch S2 with the first charge current IG1. When the indicium signal MS has low level, the selective circuit 25 selects the second charge current IG2 to charge the gate terminal of the SR switch SR2. The discharge switch 24 is coupled between the gate terminal of the SR switch SR2 and ground, the control terminal of the discharge switch 24 is coupled to the reversing output terminal of the flip-flop FF2. When the turning-OFF control signal SR_off is asserted, the discharge switch 24 is turned ON to generate a discharge path, and the gate voltage of the SR switch is decreased and the SR switch SR2 is turned OFF.

In one embodiment, the first charge current IG1 is 2 A, the first turn ON delay Ton_delay1 is 50 ns, in the fast mode. While in the slow mode, the second charge current IG2 is 250 mA, the second turn ON delay Ton_delay2 is 300 ns.

Several of the details of the embodiments described below with reference to FIG. 9 and FIG. 10.

Figure 9:
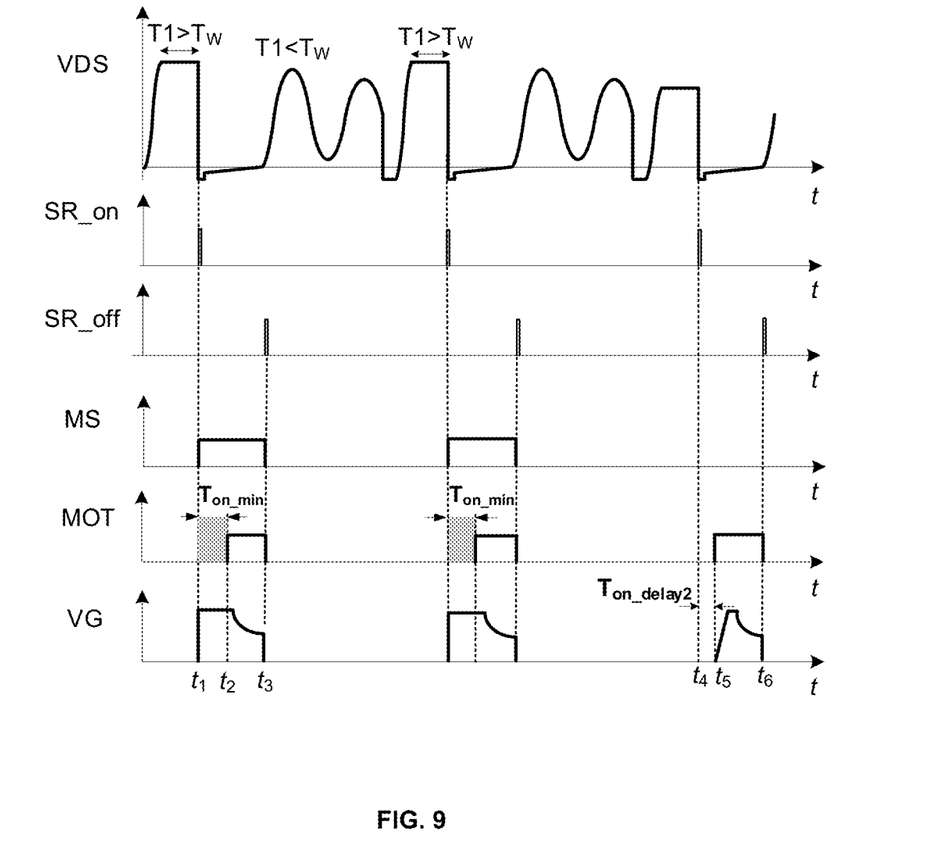
FIG. 9 illustrates working waveforms of a switching power supply circuit in accordance with an embodiment of the present invention.

FIG. 9 illustrates working waveforms of a switching power supply circuit in accordance with an embodiment of the present invention. As shown in FIG. 9, the drain-source sensing voltage VDS decreases to below the turn ON threshold voltage Vth_on, the turning-ON control signal SR_on is asserted, and the indicium signal MS is high level. After the first turn ON delay Ton_delay1, the gate voltage of the SR switch is charged with the first charge current IG1. The gate voltage of the SR switch is increased to reach the maxim value Vmax, and the SR switch is turned ON quickly. At the same time, the minimum on-time timer 23 starts timing.

At time t2, the ON-time of the SR switch reaches the minimum on-time Ton_min, the minimum on-time control signal MOT becomes high level from low level.

At time t3, the drain-source sensing voltage VDS increases to the turn off threshold voltage Vth_off, the turning-OFF control signal SR_off is asserted. At the same time, the minimum on-time control signal MOT is still high level, accordingly, the discharge switch 24 is turned ON and the SR switch is turned OFF.

At time t4, the turning-ON control signal SR_on signal is asserted, but the first time duration T1 is not longer than the window of time $T_W$, and the indicium signal MS is low level. Subsequently, after the second turn ON delay Ton_delay2, i.e., at time t5, the gate voltage of the SR switch is charged with the small second charge current IG2, and the gate voltage of the SR switch increases to the maximum value Vmax at a slow slope.

At time t6, the drain-source sensing voltage increases to the turn OFF threshold voltage Vth_off, the turning-OFF control signal SR_off is asserted, and the minimum on-time control signal MOT is high level at that time, and thus the SR switch is turned OFF immediately.

Figure 10:
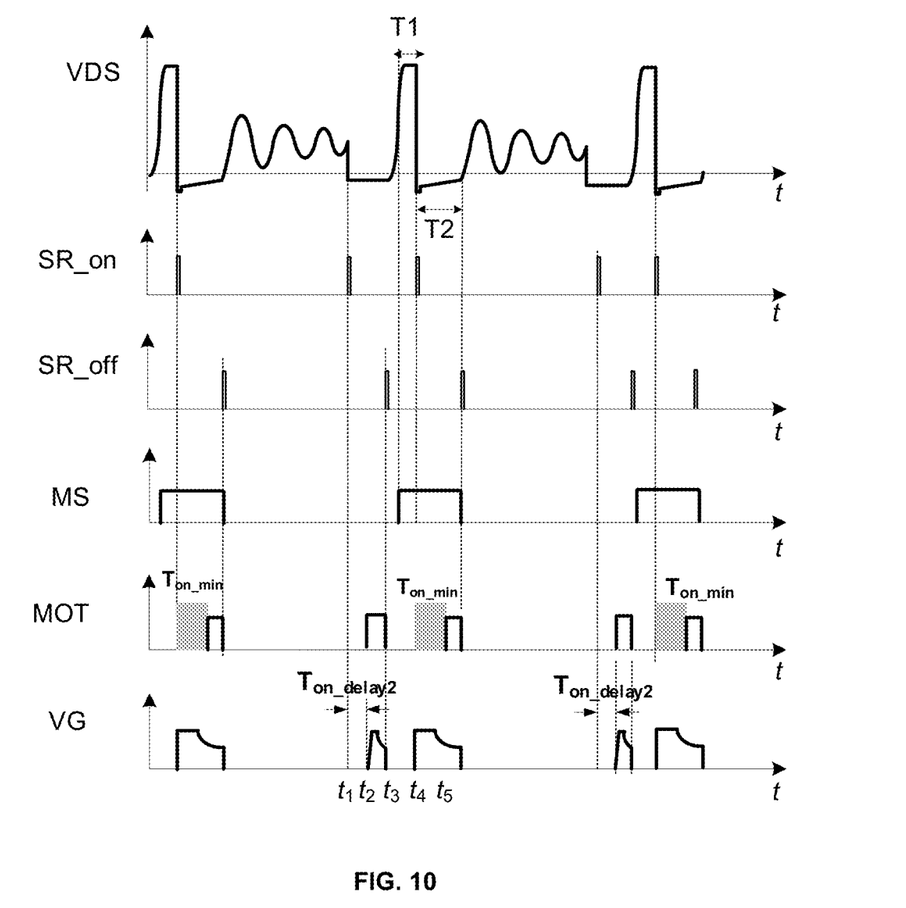
FIG. 10 illustrates working waveforms of a switching power supply circuit in accordance with another embodiment of the present invention.

FIG. 10 illustrates working waveforms of a switching power supply circuit in accordance with another embodiment of the present invention.

As shown in FIG. 10, at time t1, the turning-on control signal SR_on is asserted, and the indicium signal MS is low level. After the second turn ON delay Ton_delay2, the gate voltage of the SR switch is charged to reach the maximum voltage Vmax, to turn ON the SR switch. The minimum on-time control signal MOT is maintained to be high level.

At time t3, the drain-source sensing voltage VDS is increased to above the turn OFF threshold voltage Vth_off, the turning-OFF control signal SR_off is asserted, the discharge switch is turned ON due to the high level of the minimum on-time control signal MOT, and the gate voltage of the SR switch is decreased, the SR switch is turned OFF.

At time t4, the turning-ON control signal SR_on is asserted again, and the indicium signal MS is high level. And thus after the first turn ON delay Ton_delay1, the gate voltage of the SR switch is charged with the larger charge current IG1 to turn ON the SR switch. At the same time, the minimum on-time timer starts timing until time t5.

At time t5, the ON-time of the SR switch is timed to reach the minimum on-time Ton_min, and the minimum on-time control signal MOT becomes high level from low level.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A secondary control circuit for controlling a synchronous rectifier (SR) switch, comprising:
   a timer configured to record a time duration when a drain-source sensing voltage of the SR switch is greater than a reference voltage during a switching cycle;
   a first determination circuit configured to make a first determination whether a cycle count reaches a predetermined threshold number, wherein the cycle count indicates a number of consecutive switching cycles that the time duration is greater than an ON-time of the SR switch;
   a second determination circuit configured to make a second determination whether the time duration is greater than a predetermined window of time;
   a logic circuit configured to produce an indicium signal having a first level indicating a fast mode and a second level indicating a slow mode in response to the first determination and the second determination; and
   a gate driver circuit configured to drive the SR switch, wherein when the indicium signal has the first level, the ON-time of the SR switch is at least not less than a minimum on-time, and when the indicium signal has the second level, the ON-time of the SR switch is not limited by the minimum on-time and is turned off responsive to the drain-source sensing voltage of the SR switch exceeding a turn OFF threshold voltage.

2. The secondary control circuit of claim 1, further comprises:
   a reference voltage generator configured to sample and hold a maxim value of the drain-source sensing voltage of the SR switch and provide the maxim value of the drain-source sensing voltage as the reference voltage.

3. The secondary control circuit of claim 1, wherein:
in the fast mode, the gate driver circuit charges a gate voltage of the SR switch after a first turn ON delay, to turn ON the SR switch; and
in the slow mode, the gate driver circuit charges the gate voltage of the SR switch after a second turn ON delay, to turn ON the SR switch, wherein the second turn ON delay is longer than the first turn ON delay.

4. The secondary control circuit of claim 3, further comprises:
a turning-ON control circuit configured to provide a turning-ON control signal based on a comparison of the drain-source sensing voltage of the SR switch and a turn ON threshold voltage;
a turning-OFF control circuit configured to provide a turning-OFF control signal based on a comparison of the drain-source sensing voltage of the SR switch and the turn OFF threshold voltage; and
wherein the gate driver circuit configured provide a control signal of the SR switch based on the turning-ON control signal, the turning-OFF control signal and the indicium signal.

5. The secondary control circuit of claim 4, wherein the turning-ON control circuit comprises:
a primary ON detection circuit configured to detect whether a primary switch at a primary side is ON and to generate a primary on detection signal; and
a comparison circuit configured to compare the drain-source sensing voltage of the SR switch with the turn ON threshold voltage when the primary on detection signal is asserted and provides the turning-ON control signal.

6. The secondary control circuit of claim 4, wherein the gate driver circuit comprises:
a first AND gate having a first input terminal, a second input terminal and an output terminal, wherein the first input terminal is configured to receive the turning-OFF control signal;
a first flip-flop has a set terminal, a reset terminal and an output terminal, wherein the set terminal is configured to receive the turning-ON control signal, the reset terminal is coupled to the output terminal of the first AND gate;
a selective delay circuit having an enable terminal, a control terminal and an output terminal, wherein the enable terminal is coupled to the output terminal of the first flip-flop, the control terminal is configured to receive the indicium signal, and based on the indicium signal, the selective delay circuit provides a first turn ON delay signal with the first turn ON delay or a second turn ON delay signal with the second turn ON delay;
a first charge switch coupled in series with a first charging current source for providing a first charge current to charge the gate voltage of the SR switch when the first turning ON delay signal is asserted;
a second charge switch coupled in series with a second charging current source for providing a second charge current to charge the gate voltage of the SR switch when the second turn ON delay signal is asserted; and
a minimum on-time timer configured to provide a minimum on-time control signal to the second input terminal of the first AND gate, wherein the minimum on-time timer is enabled in the fast mode and is disabled in the slow mode.

7. The secondary control circuit of claim 4, wherein the gate driver circuit comprises:
a second AND gate having a first input terminal, a second input terminal and an output terminal, wherein the first input terminal is configured to receive the turning-OFF control signal;
a delay circuit having an input terminal configured to receive the turning-ON control signal and a control terminal configured to receive the indicium signal to determine the first turn ON delay or the second turn ON delay, the delay circuit provides a turning ON delay signal at an output terminal after the determined turn ON delay;
a second flip-flop has a set terminal, a reset terminal and an output terminal, wherein the set terminal is coupled to the output terminal of the delay circuit, the reset terminal is coupled to the output terminal of the second AND gate;
a first charge current source having an output terminal to provide a first charge current;
a second charge current source having an output terminal to provide a second charge current;
a selective circuit having an enable terminal coupled to the output terminal of the second flip-flop, based on the indicium signal, the selective circuit selects the first charge current or the second charge current to charge the gate voltage of the SR switch; and
a minimum on-time timer configured to provide a minimum on-time control signal to the second input terminal of the second AND gate, and the minimum on-time timer is enabled in the fast mode and is disabled in the slow mode.

8. A switching power supply circuit with synchronous rectification, comprising:
an energy storage component having a primary side and a secondary side;
a synchronous rectifier (SR) switch coupled to the secondary side of the energy storage component, wherein the SR switch has a drain terminal, a source terminal and a gate terminal;
a secondary control circuit, comprising:
a timer configured to record a time duration when a drain-source sensing voltage of the SR switch is greater than a reference voltage during a switching cycle;
a first determination circuit configured to make a first determination whether a cycle count reaches a predetermined threshold number, wherein the cycle count indicates a number of consecutive switching cycles that the time duration is greater than an ON-time of the SR switch;
a second determination circuit configured to make a second determination whether the time duration is greater than a predetermined window of time;
a logic circuit configured to produce an indicium signal having a first level indicating a fast mode and a second level indicating a slow mode in response to the first determination and the second determination; and
a gate driver circuit configured to drive the SR switch, wherein when the indicium signal has the first level, the ON-time of the SR switch is at least not less than a minimum on-time, and when the indicium signal has the second level, the minimum on-time limitation to the SR switch is removed and the SR switch is turned off responsive to the drain-source sensing voltage of the SR switch exceeding a turn OFF threshold voltage.

9. The switching power supply circuit of claim 8, further comprises:
a reference voltage generator configured to sample and hold a maxim value of the drain-source sensing voltage of the SR switch and provide the maxim value of the drain-source sensing voltage as the reference voltage.

10. The switching power supply circuit of claim 8, wherein
in the fast mode, the gate driver circuit charges a gate voltage of the SR switch after a first turn ON delay, to turn ON the SR switch; and
in the slow mode, the gate driver circuit charges the gate voltage of the SR switch after a second turn ON delay, to turn ON the SR switch, wherein the second turn ON delay is longer than the first turn ON delay.

11. The switching power supply circuit of claim 10, further comprises:
a turning-ON control circuit configured to provide a turning-ON control signal based on a comparison of the drain-source sensing voltage of the SR switch and a turn ON threshold voltage;
a turning-OFF control circuit configured to provide a turning-OFF control signal based on a comparison of the drain-source sensing voltage of the SR switch and the turn OFF threshold voltage; and
wherein the gate driver circuit configured provide a control signal of the SR switch based on the turning-ON control signal, the turning-OFF control signal and the indicium signal.

12. The switching power supply circuit of claim 11, wherein the gate driver circuit comprises:
a second AND gate having a first input terminal, a second input terminal and an output terminal, wherein the first input terminal is configured to receive the turning-OFF control signal;
a delay circuit having an input terminal configured to receive the turning-ON control signal and a control terminal configured to receive the indicium signal to determine the first turn ON delay or the second turn ON delay, the delay circuit provides a turn ON delay signal at an output terminal after the determined turn ON delay;
a second flip-flop has a set terminal, a reset terminal and an output terminal, wherein the set terminal is coupled to the output terminal of the delay circuit, the reset terminal is coupled to the output terminal of the second AND gate;
a first charge current source having an output terminal to provide a first charge current;
a second charge current source having an output terminal to provide a second charge current;
a selective circuit having an enable terminal coupled to the output terminal of the second flip-flop, based on the indicium signal, the selective circuit selects the first charge current or the second charge current to charge the gate voltage of the SR switch; and
a minimum on-time timer configured to provide a minimum on-time control signal to the second input terminal of the second AND gate, the minimum on-time timer is enabled in the fast mode and is disabled in the slow mode.

13. The switching power supply circuit of claim 11, wherein the turning-ON control circuit comprises:
a primary ON detection circuit configured to detect whether a primary switch at the primary side is on and to generate a primary on detection signal; and
a comparison circuit configured to compare the drain-source sensing voltage of the SR switch with the turn ON threshold voltage when the primary on detection signal is asserted and provides the turning-ON control signal.

14. The switching power supply circuit of claim 13, wherein the gate driver circuit comprises:
a first AND gate having a first input terminal, a second input terminal and an output terminal, wherein the first input terminal is configured to receive the turning-OFF control signal;
a first flip-flop has a set terminal, a reset terminal and an output terminal, wherein the set terminal is configured to receive the turning-ON control signal, the reset terminal is coupled to the output terminal of the first AND gate;
a selective delay circuit having an enable terminal, a control terminal and an output terminal, wherein the enable terminal is coupled to the output terminal of the first flip-flop, the control terminal is configured to receive the indicium signal, and based on the indicium signal, the selective delay circuit provides a first turn ON delay signal with the first turn ON delay or a second turn ON delay signal with the second turn ON delay;
a first charge switch coupled in series with a first current source for providing a first charge current to charge the gate voltage of the SR switch when the first turn ON delay signal is asserted;
a second charge switch coupled in series with a second current source for providing a second charge current to charge the gate voltage of the SR switch when the second turn ON delay signal is asserted; and
a minimum on-time timer configured to provide a minimum on-time control signal to the second input terminal of the first AND gate, wherein the minimum on-time timer is enabled in the fast mode and is disabled in the slow mode.

15. A method to control a synchronous rectifier (SR) switch in a switching power supply circuit having an energy storage component coupled to the SR switch, the method comprising:
generating a turning-ON control signal by comparing a drain-source sensing voltage of the SR switch with a turn ON threshold voltage;
recording a time duration when the drain-source sensing voltage of the SR switch is greater than a reference voltage during a switching cycle;
making a first determination whether a cycle count reaches a predetermined threshold number, wherein the cycle count indicates a number of consecutive switching cycles that the time duration is greater than an ON-time of the SR switch;
making a second determination whether the time duration is greater than a predetermined window of a time;
producing an indicium signal in response to the first determination and the second determination;
limiting an ON-time of the SR switch at least not less than a minimum on-time when the turning-ON control signal is asserted and the indicium signal having a first level indicating a fast mode; and removing the minimum on-time limitation to the SR switch and turning OFF the SR switch responsive to the drain-source sensing voltage of the SR switch exceeding a turn OFF threshold voltage when the turning-ON control signal is asserted and the indicium signal having a second level indicating a slow mode.

16. The method of claim 15, wherein:

in the fast mode, charging a gate voltage of the SR switch after a first turn ON delay, to turn ON the SR switch; and in the slow mode, charging the gate voltage of the SR switch after a second turn ON delay, to turn ON the SR switch, wherein the second turn ON delay is longer than the first turn ON delay.

17. The method of claim 16, wherein:

in the fast mode, charging the gate voltage of the SR switch with a first charge current, to turn ON the SR switch; and in the slow mode, charging the gate voltage of the SR switch with a second charge current, to turn ON the SR switch, wherein the second charge current is smaller than the first charge current.

18. The method of claim 15, further comprises:

sampling and holding a maxim value of the drain-source sensing voltage of the SR switch; and providing the maxim value of the drain-source sensing voltage as the reference voltage.

19. The method of claim 15, wherein the predetermined threshold number is greater than 2.

* * * * *